United States Patent
Iguchi

(10) Patent No.: US 11,282,642 B2
(45) Date of Patent: Mar. 22, 2022

(54) DIELECTRIC COMPOSITION AND ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/937,029

(22) Filed: Jul. 23, 2020

(65) Prior Publication Data

US 2021/0065979 A1 Mar. 4, 2021

(30) Foreign Application Priority Data

Aug. 27, 2019 (JP) .............................. JP2019-154777

(51) Int. Cl.
*C04B 35/495* (2006.01)
*H01G 4/12* (2006.01)

(52) U.S. Cl.
CPC ......... *H01G 4/1254* (2013.01); *C04B 35/495* (2013.01); *C04B 2235/3251* (2013.01); *C04B 2235/407* (2013.01); *C04B 2235/408* (2013.01); *C04B 2235/442* (2013.01); *C04B 2235/664* (2013.01); *C04B 2235/765* (2013.01)

(58) Field of Classification Search
CPC .......................... C04B 35/495; H01G 4/1254
See application file for complete search history.

(56) References Cited

U.S. PATENT DOCUMENTS

| | | | | |
|---|---|---|---|---|
| 6,403,053 B1 * | 6/2002 | Fang | ..................... | C04B 35/495 423/594.8 |
| 6,576,566 B2 * | 6/2003 | Hashimoto | ......... | C23C 14/0021 118/720 |
| 7,727,921 B2 * | 6/2010 | Takeda | .................. | C04B 35/495 501/135 |
| 8,853,115 B2 * | 10/2014 | Iguchi | .................. | C04B 35/495 501/135 |
| 8,921,248 B2 * | 12/2014 | Iguchi | ................. | C01G 33/006 501/135 |
| 2002/0004266 A1 * | 1/2002 | Hashimoto | ....... | H01L 21/02197 438/200 |
| 2020/0027659 A1 * | 1/2020 | Jung | .................... | H01G 4/1254 |

OTHER PUBLICATIONS

Podlozhenov et al.; "Structure of Strontium Barium Niobate $Sr_xBa_{1-x}Nb_2O_6$ (SBN) in the Composition Range $0.32 \leq x \leq 0.82$"; Structural Science, Acta Cryst.; (2006); vol. B62; pp. 960-965.

* cited by examiner

*Primary Examiner* — Karl E Group
(74) *Attorney, Agent, or Firm* — Oliff PLC

(57) ABSTRACT

Provided is a dielectric composition exhibiting a high specific dielectric constant and a high resistivity even when fired in a reducing atmosphere. The dielectric composition contains a composite oxide having a composition represented by $(Sr_xBa_{1-x})_yNb_2O_{5+y}$, the crystal system of the composite oxide is tetragonal, and y in the composition formula is smaller than 1.

15 Claims, 1 Drawing Sheet

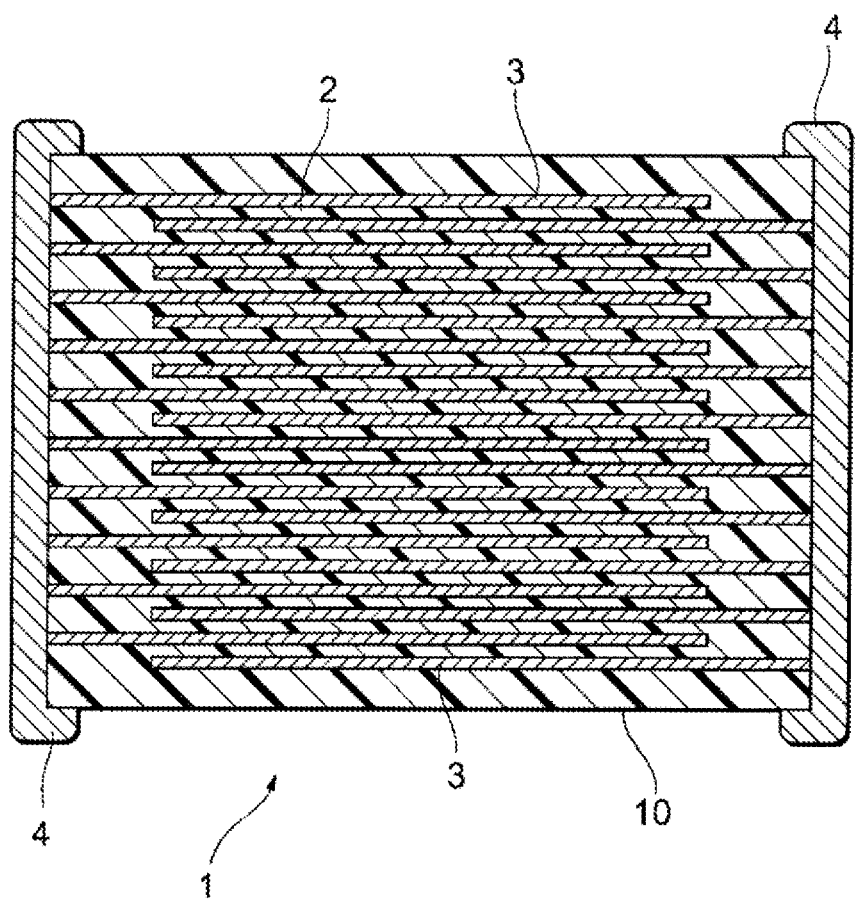

DIELECTRIC COMPOSITION AND ELECTRONIC COMPONENT

BACKGROUND OF THE INVENTION

Field of the Invention

The present invention relates to a dielectric composition and an electronic component including a dielectric layer composed of the dielectric composition.

Description of the Related Art

In an electronic circuit or a power supply circuit incorporated in electronic equipment, many electronic components such as multilayer ceramic capacitors that utilize the dielectric characteristics expressed by a dielectric are mounted. In Non-Patent Literature 1 (Acta Cryst. (2006). B62, 960-965, Sergey Podlozhenov, Heribert A. Graetsch, Julius Schneider, Michael Ulex, Manfred Wohlecke, Klaus Betzler), a ferroelectric material represented by a general formula of $Sr_xBa_{1-x}Nb_2O_6$ is disclosed as a material (dielectric material) that constitutes the dielectric of the above electronic component.

The multilayer ceramic capacitor in which internal electrodes are made of base metal is manufactured by being reduction-fired in an atmosphere having a lower oxygen partial pressure than in air and then subjected to annealing. The inventor has found a problem that the dielectric composition described in Non-Patent Literature 1 has a low resistivity when fired and manufactured under a low oxygen partial pressure.

SUMMARY OF THE INVENTION

The present invention has been made in view of the above circumstances, and an objective thereof is to provide a dielectric composition exhibiting a high specific dielectric constant and a high resistivity even when fired in a reducing atmosphere, and an electronic component including a dielectric layer composed of the dielectric composition.

In order to achieve the above objective, the dielectric composition according to the first aspect of the present invention contains a composite oxide having a composition formula represented by $(Sr_xBa_{1-x})_yNb_2O_{5+y}$, the crystal system of the composite oxide is tetragonal, and y in the composition formula is smaller than 1.

The inventor has found that the dielectric composition according to the first aspect of the present invention can exhibit a high specific dielectric constant and a high resistivity by having the above configuration. The following reasons are considered as the reasons why this effect is obtained.

When an oxide represented by a general formula of $(Sr_xBa_{1-x})_1Nb_2O_6$ is fired in a reducing atmosphere, oxygen is deprived from the oxide, and oxygen defects and free electrons are generated in pairs. As a result, it is considered that the conductivity obtained by the motion of the generated free electrons is generated and the resistivity of the oxide is reduced.

In contrast, by y in the composition formula being smaller than 1 as in the above composite oxide, cation defects and oxygen defects are generated at the same time. As a result, because the oxygen defects are present to some extent in the composite oxide, the reaction generating oxygen defects and free electrons accompanying reduction firing is not prone to proceed. That is, even in a reducing atmosphere, the reaction in which oxygen is deprived from the composite oxide and free electrons are generated is not prone to occur. Accordingly, it is considered that free electrons are not prone to be generated and thus the reduction in resistivity is suppressed.

In addition, it is considered that the crystal system of the composite oxide is tetragonal and thereby the specific dielectric constant tends to be improved.

For the above reasons, it is considered that the dielectric composition according to the first aspect of the present invention can exhibit a high specific dielectric constant and a high resistivity by having the above configuration.

In the dielectric composition according to the first aspect of the present invention, the space group of the composite oxide may be P4bm.

Thereby, the dielectric composition according to the first aspect of the present invention can exhibit a high specific dielectric constant and a high resistivity.

In the dielectric composition according to the first aspect of the present invention, x in the composition formula may be 0.2 to 0.7.

Thereby, the dielectric composition according to the first aspect of the present invention can exhibit a high specific dielectric constant and a high resistivity. In addition, by containing x in the composition formula in the above range, a composite oxide having a tetragonal crystal system is easily obtained, and the specific dielectric constant tends to be improved.

In order to achieve the above objective, the dielectric composition according to the second aspect of the present invention contains a composite oxide having a composition formula represented by $(Sr_xBa_{1-x})_yNb_2O_{5+y}$, wherein x in the composition formula is 0.2 to 0.7, and y in the composition formula is smaller than 1.

The inventor has found that the dielectric composition according to the second aspect of the present invention can exhibit a high specific dielectric constant and a high resistivity by having the above configuration. The following reasons are considered as the reasons why this effect is obtained.

First, similar to the dielectric composition according to the first aspect of the present invention, the dielectric composition according to the second aspect of the present invention contains the composite oxide having the composition formula represented by $(Sr_xBa_{1-x})_yNb_2O_{5+y}$, and y in the composition formula is smaller than 1. Therefore, similar to the dielectric composition according to the first aspect of the present invention, y in the composition formula is smaller than 1, and thereby a cation defect state and an oxygen defect state are formed. As a result, because the oxygen defects are present to some extent in the composite oxide, the reaction generating oxygen defects and free electrons accompanying reduction firing is not prone to proceed. That is, even in a reducing atmosphere, the reaction in which oxygen is deprived from the composite oxide and free electrons are generated is suppressed. Accordingly, it is considered that free electrons are not prone to be generated and thus the reduction in resistivity is suppressed.

In addition, it is considered that by containing x in the composition formula in the above range, a composite oxide in which the crystal system is tetragonal is easily obtained and the specific dielectric constant tends to be improved.

For the above reasons, it is considered that the dielectric composition according to the second aspect of the present invention can exhibit a high specific dielectric constant and a high resistivity by having the above configuration.

In the dielectric composition according to the first aspect and the dielectric composition according to the second aspect of the present invention, y in the composition formula may be 0.95 or less.

Thereby, the dielectric composition according to the first aspect and the dielectric composition according to the second aspect of the present invention can exhibit a higher resistivity.

The dielectric composition according to the first aspect and the dielectric composition according to the second aspect of the present invention may contain a first subcomponent element, and the first subcomponent element may be at least one selected from the group consisting of copper, zinc, palladium, tantalum, and tin.

Thereby, the dielectric composition according to the first aspect and the dielectric composition according to the second aspect of the present invention can maintain a high specific dielectric constant and further improve the resistivity.

In the dielectric composition according to the first aspect and the dielectric composition according to the second aspect of the present invention, the first subcomponent element may be contained in an amount of 10 parts by mole or less with respect to 100 parts by mole of niobium in the composite oxide.

Thereby, the dielectric composition according to the first aspect and the dielectric composition according to the second aspect of the present invention can maintain a high specific dielectric constant and further improve the resistivity.

The dielectric composition according to the first aspect and the dielectric composition according to the second aspect of the present invention may contain a second subcomponent element, and the second subcomponent element may be at least one selected from the group consisting of gallium, potassium, molybdenum, boron, nickel, and zirconium.

Thereby, the dielectric composition according to the first aspect and the dielectric composition according to the second aspect of the present invention can maintain a high specific dielectric constant and further improve the resistivity.

In the dielectric composition according to the first aspect and the dielectric composition according to the second aspect of the present invention, the second subcomponent element may be contained in an amount of 10 parts by mole or less with respect to 100 parts by mole of niobium in the composite oxide.

Thereby, the dielectric composition according to the first aspect and the dielectric composition according to the second aspect of the present invention can maintain a high specific dielectric constant and further improve the resistivity.

The electronic component of the present invention includes a dielectric layer containing the dielectric composition according to the first aspect or the dielectric composition according to the second aspect.

Thereby, the electronic component of the present invention can exhibit a high specific dielectric constant and a high resistivity even when fired in a reducing atmosphere together with, for example, an electrode layer containing base metal as a main component.

BRIEF DESCRIPTION OF THE DRAWINGS

FIGURE is a cross-sectional view of a multilayer ceramic capacitor according to an embodiment of the present invention.

DETAILED DESCRIPTION OF THE PREFERRED EMBODIMENTS (1. Multilayer Ceramic Capacitor)
(1.1 Overall Configuration of Multilayer Ceramic Capacitor)

FIGURE shows a multilayer ceramic capacitor 1 as an example of an electronic component according to this embodiment. The multilayer ceramic capacitor 1 has an element body 10 configured so that dielectric layers 2 and internal electrode layers 3 are alternately stacked. At both ends of the element body 10, a pair of external electrodes 4 conductive with each of the internal electrode layers 3 alternately disposed inside the element body 10 is formed. The shape of the element body 10 is not particularly limited and is usually a rectangular parallelepiped. In addition, the size of the element body 10 is not particularly limited and may be an appropriate size according to the application.

(1.2 Dielectric Layer)

The dielectric layer 2 is composed of a dielectric composition (described later) according to the embodiment.

The thickness of each layer (interlayer thickness) of the dielectric layers 2 is not particularly limited and can be set arbitrarily according to the desired characteristic, application, or the like. Usually, the interlayer thickness is preferably 30 μm or less, more preferably 20 μm or less, and further preferably 10 μm or less. In addition, the stacked number of the dielectric layers 2 is not particularly limited and is preferably, for example, 20 or more in the embodiment.

(1.3 Internal Electrode Layer)

In the embodiment, the internal electrode layers 3 are stacked so that the ends are alternately exposed on the surfaces of two end faces of the element body 10 facing each other.

The main component of the conductive material contained in the internal electrode layer 3 is base metal. Here, the main component is a component that accounts for 80% by mass or more of the conductive material contained in the internal electrode layer 3. The base metal is not particularly limited; for example, a conductive material known as the base metal, such as Ni, Ni-based alloys, Cu, or Cu-based alloys, may be used. Besides, in Ni, Ni-based alloys, Cu, or Cu-based alloys, various trace components such as P or S may be contained in an amount of about 0.1% by mass or less. In addition, the internal electrode layer 3 may be formed using a commercially available electrode paste. The thickness of the internal electrode layer 3 may be appropriately determined according to the application and the like.

(1.4 External Electrode)

The conductive material contained in the external electrode 4 is not particularly limited. For example, a known conductive material such as Ni, Cu, Sn, Ag, Pd, Pt, Au, an alloy thereof, or a conductive resin may be used. The thickness of the external electrode 4 may be appropriately determined according to the application and the like.

(2. Dielectric Composition)

The dielectric composition constituting the dielectric layer 2 according to the embodiment contains a composite oxide having a composition formula represented by $(Sr_xBa_{1-x})_yNb_2O_{5+y}$, and may contain, if necessary, a first subcomponent element, a second subcomponent element, and other component elements.

(2.1 Composite Oxide)

The composite oxide of the embodiment has a composition formula represented by $(Sr_xBa_{1-x})_yNb_2O_{5+y}$, and y in the composition formula is smaller than 1. In the embodiment, y in the composition formula is preferably 0.95 or less.

The lower limit of y in the composition formula is not limited in a range in which the effect of the present invention is obtained, and is preferably, for example, 0.8 or more.

The inventor has found that by the fact that y in the composition formula is smaller than 1, the composite oxide can exhibit a high resistivity even when fired in a reducing atmosphere. That is, the multilayer ceramic capacitor 1 obtained by firing, in a reducing atmosphere, a dielectric composition containing the composite oxide at the same time of firing an electrode composed of base metal can exhibit a high specific dielectric constant and a high resistivity.

The reason why a high resistivity can be obtained even when the dielectric composition according to the embodiment is fired in a reducing atmosphere can be estimated as follows for example.

When an oxide represented by a general formula of $(Sr_xBa_{1-x})_1Nb_2O_6$ is fired in a reducing atmosphere, oxygen is deprived from the oxide, and oxygen defects and free electrons are generated in pairs. As a result, it is considered that the conductivity obtained by the motion of the generated free electrons is generated and the resistivity of the oxide is reduced.

In contrast, by y in the composition formula being smaller than 1 as in the above composite oxide, a cation defect state and an oxygen defect state are formed. As a result, because the oxygen defects are present to some extent in the composite oxide, the reaction generating oxygen defects and free electrons accompanying reduction firing is not prone to proceed. That is, even in a reducing atmosphere, the reaction in which oxygen is deprived from the composite oxide and free electrons are generated is not prone to occur. Accordingly, it is considered that free electrons are not prone to generate and thus the reduction in resistivity is suppressed.

In addition, the crystal system of the composite oxide of the embodiment is tetragonal. Thereby, it is considered that a high specific dielectric constant can be exhibited.

When the composite oxide has the composition formula represented by $(Sr_xBa_{1-x})_yNb_2O_{5+y}$ and the crystal structure is tetragonal, compared with the case in which the crystal structure is cubic, orthorhombic, hexagonal, or monoclinic, the range of displacement of $Nb^{5+}$ ions in the crystal becomes larger and thus polarization becomes easier when an electric field is applied. Therefore, it is considered that the specific dielectric constant tends to be higher in the case that the crystal system of the composite oxide is tetragonal than in the case that the crystal system is cubic, orthorhombic, hexagonal, or monoclinic.

In addition, the space group of the composite oxide of the embodiment is P4bm. Thereby, it is possible to exhibit a high specific dielectric constant and a high resistivity. The reason is considered to be that the range of displacement of $Nb^{5+}$ ions in the crystal becomes larger.

In the embodiment, x in the composition formula is preferably 0.2 to 0.7. By containing x in the composition formula within the above range, it is possible to exhibit a high specific dielectric constant and a high resistivity. In addition, by containing x in the composition formula within the above range, the composite oxide having a tetragonal crystal system is easily obtained, and the specific dielectric constant tends to be improved. In the embodiment, x in the composition formula is more preferably 0.2 to 0.6.

(2.2 First Subcomponent Element)

The dielectric composition according to the embodiment may contain the first subcomponent element. It is possible to maintain a high specific dielectric constant and further improve the resistivity by the dielectric composition containing the first subcomponent element.

The first subcomponent element in the embodiment is at least one selected from the group consisting of copper (Cu), zinc (Zn), palladium (Pd), tantalum (Ta), and tin (Sn), and is preferably copper (Cu), zinc (Zn), and palladium (Pd). As the first subcomponent element, only one type of element may be used, or two or more types of elements may be used concurrently.

The first subcomponent element in the embodiment is preferably contained in an amount of 10 parts by mole or less with respect to 100 parts by mole of niobium (Nb) in the composite oxide represented by the formula of $(Sr_xBa_{1-x})_yNb_2O_{5+y}$. Thereby, it is possible to maintain a high specific dielectric constant and further improve the resistivity. The first subcomponent element in the embodiment is more preferably contained in an amount of 1 to 10 parts by mole and further preferably contained in an amount of 3 to 10 parts by mole with respect to 100 parts by mole of niobium (Nb) in the composite oxide represented by the formula of $(Sr_xBa_{1-x})_yNb_2O_{5+y}$.

(2.3 Second Subcomponent Element)

The dielectric composition according to the embodiment may contain the second subcomponent element. It is possible to maintain a high specific dielectric constant and further improve the resistivity by the dielectric composition containing the second subcomponent element.

The second subcomponent element is at least one selected from the group consisting of gallium (Ga), potassium (K), molybdenum (Mo), boron (B), nickel (Ni), and zirconium (Zr), and is preferably gallium (Ga), potassium (K), and molybdenum (Mo). As the second subcomponent element, only one type of element may be used, or two or more types of elements may be used concurrently.

The second subcomponent element in the embodiment is preferably contained in an amount of 10 parts by mole or less with respect to 100 parts by mole of niobium (Nb) in the composite oxide represented by the formula of $(Sr_xBa_{1-x})_yNb_2O_{5+y}$. Thereby, it is possible to maintain a high specific dielectric constant and further improve the resistivity. The second subcomponent element in the embodiment is more preferably contained in an amount of 1 to 10 parts by mole and further preferably contained in an amount of 3 to 10 parts by mole with respect to 100 parts by mole of niobium (Nb) in the composite oxide represented by the formula of $(Sr_xBa_{1-x})_yNb_2O_{5+y}$.

(3. Manufacturing Method for Multilayer Ceramic Capacitor)

Next, an example of a manufacturing method for the multilayer ceramic capacitor 1 shown in FIGURE is described below.

First, a starting raw material of the dielectric composition is prepared. As the starting raw material, a composite oxide constituting the dielectric composition can be used. In addition, oxides of the metals contained in the composite oxide can be used. In addition, various compounds which become components constituting the composite oxide by firing can be used. Examples of the various compounds include carbonates, oxalates, nitrates, hydroxides, organometallic compounds and the like. In the embodiment, the starting raw material is preferably powder.

When the dielectric composition contains the first subcomponent element, a raw material containing the first subcomponent element is prepared. In addition, when the dielectric composition contains the second subcomponent element, a raw material containing the second subcomponent element is prepared. As the raw material containing the first subcomponent element or the raw material containing the second subcomponent element, similar to the raw material of the composite oxide, various compounds such as oxides and the like can be used.

The raw material of the composite oxide among the prepared starting raw materials is weighed at a predetermined proportion, and then wet-mixed for a predetermined time using a ball mill or the like. The mixed powder is dried and then heat-treated at 700° C. to 1300° C. in the atmosphere, and calcined powder of the composite oxide is obtained. In addition, the calcined powder may be pulverized for a predetermined time using a ball mill or the like.

Subsequently, a paste for producing a green chip is prepared. The obtained calcined powder, a binder, and a solvent are kneaded into slurry to prepare a paste for dielectric layer. A known binder and solvent may be used.

Besides, when the dielectric composition contains the first subcomponent element, the calcined powder, raw material powder containing the first subcomponent element, a binder, and a solvent are kneaded into slurry to prepare the paste for dielectric layer.

In addition, when the dielectric composition contains the second subcomponent element, the calcined powder, raw material powder containing the second subcomponent element, a binder, and a solvent are kneaded into slurry to prepare the paste for dielectric layer.

The paste for dielectric layer may contain additives such as a plasticizer or a dispersant if necessary.

A paste for internal electrode is obtained by kneading the raw material of the conductive material, a binder, and a solvent. A known binder and solvent may be used. The paste for internal electrode may contain additives such as an inhibitor or a plasticizer if necessary.

A paste for external electrode can be prepared in the same manner as the paste for internal electrode.

The obtained pastes are used to form a green sheet and an internal electrode pattern, and the green sheet and the internal electrode pattern are stacked to obtain a green chip.

The obtained green chip is subjected to binder removal treatment if necessary. As a condition of the binder removal treatment, for example, the retention temperature is preferably set at 200° C. to 350° C.

After the binder removal treatment, the green chip is fired, and the element body 10 is obtained. In the embodiment, firing under a reducing atmosphere (reduction firing) can be performed. In the embodiment, the retention temperature during firing is preferably set at 1200° C. to 1350° C. Even if the retention temperature during firing is set relatively low in this manner, the dielectric composition of the embodiment is easily obtained.

After the firing, the obtained element body 10 is subjected to reoxidation treatment (annealing) if necessary. The annealing conditions may be known conditions; for example, the oxygen partial pressure during annealing is preferably set higher than the oxygen partial pressure during firing, and the retention temperature is preferably set at 1150° C. or lower.

The dielectric composition constituting the dielectric layer 2 of the element body 10 obtained as described above is the above dielectric composition. The element body 10 is subjected to end face polishing, the paste for external electrode is applied and baked, and the external electrode 4 is formed. Then, if necessary, a coating layer is formed on the surface of the external electrode 4 by plating or the like.

In this manner, the multilayer ceramic capacitor 1 according to the embodiment is manufactured.

(3. Variation Example)

In the above embodiment, the case in which the electronic component according to the present invention is a multilayer ceramic capacitor has been described, but the electronic component according to the present invention is not limited to the multilayer ceramic capacitor and may be any electronic component having the above dielectric composition.

For example, the electronic component may be a single-plate-type ceramic capacitor in which a pair of electrodes is formed on the above dielectric composition.

In addition, the dielectric composition may not contain the first subcomponent element and the second subcomponent element. Furthermore, the dielectric composition may contain at least one of the first subcomponent element and the second subcomponent element.

The embodiment of the present invention has been described above, but the present invention is not limited to the above embodiment and may be modified in various ways within the scope of the present invention.

Example

Hereinafter, the present invention is described in more detail with reference to examples and comparative examples. However, the present invention is not limited to the following examples.

Experiment 1

Powders of barium carbonate ($BaCO_3$), strontium carbonate ($SrCO_3$), and niobium oxide ($Nb_2O_5$) were prepared as the starting raw materials of the composite oxide contained in the dielectric composition. The prepared starting raw materials were weighed so that x and y of the composite oxide contained in the dielectric composition after firing are as shown in Table 1.

Next, the weighed powders were wet-mixed for 16 hours by a ball mill using ion-exchanged water serving as a dispersion medium, and the mixture was dried to obtain a mixed raw material powder. Thereafter, the obtained mixed raw material powder was heat-treated in the atmosphere under the conditions of a retention temperature of 900° C. and a retention time of 2 hours, and calcined powder of the composite oxide was obtained.

The obtained calcined powder was wet-pulverized by a ball mill for 16 hours using ion-exchanged water serving as a dispersion medium, and the pulverized product was dried.

10% by mass of an aqueous solution containing 6% by mass of a polyvinyl alcohol resin serving as a binder was added to 100% by mass of the pulverized calcined powder to perform granulation, and granulated powder was obtained.

The obtained granulated powder was put into a press mold of φ12 mm, subjected to temporary press molding at a pressure of 0.6 ton/cm², and further subjected to formal press molding at a pressure of 1.2 ton/cm², to thereby obtain a disc-shaped green molded body.

The obtained green molded body was fired in a reducing atmosphere and further subjected to annealing treatment, and a sintered body (dielectric composition) fired in a reducing atmosphere was obtained. As the firing conditions, the heating rate was set to 200° C./h, the retention temperature was set at 1300° C., and the retention time was set to 2 hours. The atmospheric gas was a mixed gas of nitrogen and hydrogen (hydrogen concentration 3%) humidified to a dew point of 20° C. In addition, as the annealing treatment conditions, the retention temperature was set at 1050° C. and the retention time was set to 2 hours. The atmospheric gas was a nitrogen gas humidified to a dew point of 20° C.

A disc-shaped ceramic capacitor sample was obtained by applying an In—Ga alloy to both main surfaces of the obtained sintered body to form a pair of electrodes.

An X-ray structure analyzer was used to analyze the crystal system and the space group of the composite oxide contained in the obtained dielectric composition. The results are shown in Table 1.

The density of the capacitor sample was measured as follows. The diameter of the disc-shaped capacitor sample after firing was measured at three locations to obtain a diameter R. Next, the thickness of the disc-shaped capacitor sample was measured at three locations to obtain a thickness h. The obtained R and h were used to calculate a volume V $(=\frac{1}{4}\cdot\pi\cdot R^2 \cdot h)$ of the disc-shaped capacitor sample. Here, π indicates the circular constant. Subsequently, the density of the disc-shaped capacitor sample was obtained by measuring a mass m of the disc-shaped capacitor sample and calculating m/V. The average values of the density results evaluated for three samples are shown in Table 1.

For the capacitor sample, a digital resistance meter (R8340 manufactured by ADVANTEST) was used to measure the insulation resistance at a reference temperature (25° C.). The resistivity was calculated from the obtained insulation resistance, the effective electrode area, and the thickness of the dielectric layer. Higher resistivity is preferable. The results are shown in Table 1.

For the sample having a resistivity of $1.0\times10^8$ (Ω·m) or more, a signal having a frequency of 1 kHz and an input signal level (measurement voltage) of 1 Vrms was input by a digital LCR meter (4284A manufactured by YHP) at room temperature (20° C.), and the capacitance was measured. Then, the specific dielectric constant (no unit) was calculated based on the thickness of the dielectric layer, the effective electrode area, and the capacitance obtained by the measurement. Higher specific dielectric constant is preferable. The results are shown in Table 1.

Besides, the specific dielectric constant of the sample having a resistivity of $1.0\times10^4$ (Ω·m) or more and less than $1.0\times10^8$ (Ω·m) was calculated based on the capacitance measured at a frequency of 1 MHz. This is because the measurement values of the capacitances of these samples measured at a frequency of 1 kHz are strongly affected by the low resistance of the samples and lack reliability.

TABLE 1

| Sample number | X | y | Crystal system | Space group | Density [g/cm³] | Specific dielectric constant | Resistivity [Ω·m] |
|---|---|---|---|---|---|---|---|
| | | | | | After reduction firing (1300° C.) and annealing (1050° C.) | | |
| 1 | 0.00 | 0.90 | Hexagonal | P6/mmm | 5.02 | 50 | 4.0E+08 |
| 2 | 0.20 | 0.90 | Tetragonal | P4bm | 5.11 | 550 | 1.3E+04 |
| 3 | 0.40 | 0.90 | Tetragonal | P4bm | 5.08 | 441 | 1.6E+05 |
| 4 | 0.60 | 0.90 | Tetragonal | P4bm | 4.99 | 1420 | 1.2E+04 |
| 4a | 0.70 | 0.90 | Tetragonal | P4bm | 4.97 | 320 | 1.1E+04 |
| 5 | 0.80 | 0.90 | Monoclinic | P21/c | 4.81 | 35 | 1.8E+08 |
| 6 | 1.00 | 0.90 | Monoclinic | P21/c | 4.96 | 33 | 9.3E+07 |
| 7 | 0.00 | 0.95 | Hexagonal | P6/mmm | 5.02 | 50 | 4.0E+08 |
| 8 | 0.20 | 0.95 | Tetragonal | P4bm | 5.02 | 580 | 1.2E+04 |
| 9 | 0.40 | 0.95 | Tetragonal | P4bm | 5.10 | 450 | 1.1E+05 |
| 10 | 0.60 | 0.95 | Tetragonal | P4bm | 5.00 | 1610 | 1.1E+04 |
| 10a | 0.70 | 0.95 | Tetragonal | P4bm | 4.92 | 330 | 1.0E+04 |
| 11 | 0.80 | 0.95 | Monoclinic | P21/c | 4.90 | 38 | 2.0E+08 |
| 12 | 1.00 | 0.95 | Monoclinic | P21/c | 4.98 | 36 | 7.0E+07 |
| 13 | 0.00 | 1.00 | Orthorhombic | C2221 | 5.37 | 27 | 2.7E+09 |
| 14 | 0.20 | 1.00 | Tetragonal | P4bm | 5.11 | 416 | 4.8E+02 |
| 15 | 0.40 | 1.00 | Tetragonal | P4bm | 5.05 | 668 | 1.6E+00 |
| 16 | 0.60 | 1.00 | Tetragonal | P4bm | 5.01 | 2861 | 3.5E−01 |
| 17 | 0.80 | 1.00 | Monoclinic | P21/c | 4.74 | 32 | 2.6E+09 |
| 18 | 1.00 | 1.00 | Monoclinic | P21/c | 5.02 | 24 | 1.0E+08 |
| 20 | 0.40 | 0.80 | Tetragonal | P4bm | 5.10 | 320 | 8.1E+05 |

From Table 1, confirmation could be made that when the composite oxide in which the crystal system is tetragonal and y is smaller than 1 is used (Sample No. 2 to 4, 4a and 8 to 10), a high specific dielectric constant and a high resistivity are exhibited even if firing is performed in a reducing atmosphere.

Experiment 2

As the starting raw materials of the first subcomponent element or the second subcomponent element shown in Tables 2 to 6, powders of oxides of the first subcomponent element or the second subcomponent element were prepared. In addition, the prepared starting raw materials were weighed so that the amount of the first subcomponent element or the second subcomponent element in the dielectric composition after firing has the values shown in Tables 2 to 6. Besides, the "amount" of the first subcomponent element or the second subcomponent element shown in Tables 2 to 6 refers to an amount with respect to 100 parts by mole of niobium (Nb) in the composite oxide.

With respect to 100% by mass of the mixture of the calcined powder of the pulverized composite oxide obtained by the method shown in Experiment 1 and the oxide of the first subcomponent element or the oxide of the second subcomponent element, 10% by mass of an aqueous solution containing 6% by mass of a polyvinyl alcohol resin serving as a binder was added to perform granulation, and granulated powder was obtained. A disc-shaped ceramic capacitor sample was obtained in the same manner as in Sample No. 3 of Experiment 1 except for the above description.

In addition, confirmation could be made that when the crystal system and the space group of the obtained sintered body are analyzed in the same manner as in Experiment 1, each sample in Tables 2 to 6 has a tetragonal crystal system and a space group of P4bm.

Furthermore, the density, the resistivity and the specific dielectric constant were measured in the same manner as in Experiment 1. Each sample in Tables 3 to 5 had a specific dielectric constant of 300 or more. The results of the density and the resistivity are shown in Tables 2 to 6.

TABLE 2

| Sample number | First subcomponent element Type | Amount with respect to 100 parts by mole of Nb in composite oxide [parts by mole] | After reduction firing (1300° C.) and annealing (1050° C.) | | |
|---|---|---|---|---|---|
| | | | Density [g/cm³] | Specific dielectric constant | Resistivity [Ω · m] |
| 3 | None | — | 5.08 | 441 | 1.6E+05 |
| 21 | Cu | 5 | 4.94 | 402 | 3.8E+10 |
| 22 | Zn | 5 | 4.84 | 467 | 1.2E+10 |
| 23 | Pd | 5 | 4.98 | 544 | 2.8E+09 |
| 24 | Ta | 5 | 4.48 | 403 | 2.4E+08 |
| 25 | Sn | 5 | 4.91 | 1503 | 1.1E+08 |

$x = 0.40$,
$y = 0.90$
Crystal system: tetragonal
Space group: P4bm

TABLE 3

| Sample number | Second subcomponent element Type | Amount with respect to 100 parts by mole of Nb in composite oxide [parts by mole] | After reduction firing (1300° C.) and annealing (1050° C.) | |
|---|---|---|---|---|
| | | | Density [g/cm³] | Resistivity [Ω · m] |
| 3 | None | — | 5.08 | 1.6E+05 |
| 31 | Ga | 5 | 4.58 | 4.1E+06 |
| 32 | K | 5 | 5.12 | 4.5E+05 |
| 33 | Mo | 5 | 4.93 | 3.8E+05 |
| 34 | B | 5 | 4.87 | 3.7E+05 |
| 35 | Ni | 5 | 5.05 | 3.1E+05 |
| 36 | Zr | 5 | 4.86 | 2.2E+05 |

$x = 0.40$,
$y = 0.90$
Crystal system: tetragonal
Space group: P4bm

TABLE 4

| Sample number | First subcomponent element Type | Amount with respect to 100 parts by mole of Nb in composite oxide [parts by mole] | After reduction firing (1300° C.) and annealing (1050° C.) | |
|---|---|---|---|---|
| | | | Density [g/cm³] | Resistivity [Ω · m] |
| 3 | None | — | 5.08 | 1.6E+05 |
| 41 | Cu | 10 | 4.96 | 4.3E+10 |
| 42 | Zn | 10 | 4.81 | 1.5E+10 |
| 43 | Pd | 10 | 5.02 | 3.2E+09 |
| 44 | Ta | 10 | 4.26 | 2.4E+08 |
| 45 | Sn | 10 | 4.91 | 1.3E+08 |

$x = 0.40$,
$y = 0.90$
Crystal system: tetragonal
Space group: P4bm

TABLE 5

| Sample number | Second subcomponent element Type | Amount with respect to 100 parts by mole of Nb in composite oxide [parts by mole] | After reduction firing (1300° C.) and annealing (1050° C.) | |
|---|---|---|---|---|
| | | | Density [g/cm³] | Resistivity [Ω · m] |
| 3 | None | — | 5.08 | 1.6E+05 |
| 51 | Ga | 10 | 4.42 | 4.2E+06 |
| 52 | K | 10 | 5.23 | 5.1E+05 |
| 53 | Mo | 10 | 4.95 | 4.6E+05 |
| 54 | B | 10 | 4.85 | 4.4E+05 |
| 55 | Ni | 10 | 5.11 | 3.2E+05 |
| 56 | Zr | 10 | 4.84 | 2.8E+05 |

$x = 0.40$,
$y = 0.90$
Crystal system: tetragonal
Space group: P4bm

TABLE 6

| Sample number | First subcomponent element Type | Amount with respect to 100 parts by mole of Nb in composite oxide [parts by mole] | After reduction firing (1300° C.) and annealing (1050° C.) Resistivity [Ω · m] |
|---|---|---|---|
| 3 | None | — | 1.6E+05 |
| 61 | Cu | 1 | 2.5E+09 |
| 62 | Cu | 2.5 | 9.0E+09 |
| 63 | Cu | 3 | 3.0E+10 |
| 21 | Cu | 5 | 3.8E+10 |
| 64 | Cu | 6 | 4.1E+10 |
| 41 | Cu | 10 | 4.3E+10 |

$x = 0.40$,
$y = 0.90$
Crystal system: tetragonal
Space group: P4bm

From Tables 2 and 4, confirmation could be made that the resistivity is higher in the case of containing the first subcomponent element (Sample No. 21 to 25, 41 to 45) than in the case of not containing the first subcomponent element (Sample No. 3). In addition, confirmation could be made that the resistivity is higher in the case that the amount of the first subcomponent element is 10 parts by mole (Sample No. 41 to 45) than in the case that the amount of the first subcomponent element is 5 parts by mole (Sample No. 21 to 25).

From Tables 3 and 5, confirmation could be made that the resistivity is higher in the case of containing the second subcomponent element (Sample No. 31 to 36, 51 to 56) than in the case of not containing the second subcomponent element (Sample No. 3). In addition, confirmation could be made that the resistivity is higher in the case that the amount of the second subcomponent element is 10 parts by mole (Sample No. 51 to 56) than in the case that the amount of the second subcomponent element is 5 parts by mole (Sample No. 31 to 36).

From Table 6, confirmation could be made that the resistivity is higher in the case that the amount of copper (Cu) serving as the first subcomponent element is 1-10 parts by mole (Sample No. 21, 41 and 61 to 64) than in the case of not containing the first subcomponent element (Sample No. 3).

What is claimed is:
1. A dielectric composition comprising a composite oxide having a composition formula represented by $(Sr_xBa_{1-x})_yNb_2O_{5+y}$, wherein the crystal system of the com- posite oxide is tetragonal, y in the composition formula is 0.8 or more and smaller than 1, and x in the composition formula is 0.2 to 0.7.

2. The dielectric composition according to claim 1, wherein the space group of the composite oxide is P4bm.

3. The dielectric composition according to claim 1, wherein y in the composition formula is 0.95 or less.

4. The dielectric composition according to claim 1, further comprising a first subcomponent element,
wherein the first subcomponent element is at least one selected from the group consisting of copper, zinc, palladium, tantalum, and tin.

5. The dielectric composition according to claim 4, wherein the first subcomponent element is contained in an amount of 10 parts by mole or less with respect to 100 parts by mole of niobium in the composite oxide.

6. The dielectric composition according to claim 1, comprising a second subcomponent element,
wherein the second subcomponent element is at least one selected from the group consisting of gallium, potassium, molybdenum, boron, nickel, and zirconium.

7. The dielectric composition according to claim 6, wherein the second subcomponent element is contained in an amount of 10 parts by mole or less with respect to 100 parts by mole of niobium in the composite oxide.

8. An electronic component, comprising a dielectric layer containing the dielectric composition according to claim 1.

9. A dielectric composition, comprising a composite oxide represented by $(Sr_xBa_{1-x})_yNb_2O_{5+y}$,
wherein x in the composition formula is 0.2 to 0.7, and y in the composition formula is 0.8 or more and smaller than 1.

10. The dielectric composition according to claim 9, wherein y in the composition formula is 0.95 or less.

11. The dielectric composition according to claim 9, further comprising a first subcomponent element,
wherein the first subcomponent element is at least one selected from the group consisting of copper, zinc, palladium, tantalum, and tin.

12. The dielectric composition according to claim 11, wherein the first subcomponent element is contained in an amount of 10 parts by mole or less with respect to 100 parts by mole of niobium in the composite oxide.

13. The dielectric composition according to claim 9, further comprising a second subcomponent element,
wherein the second subcomponent element is at least one selected from the group consisting of gallium, potassium, molybdenum, boron, nickel, and zirconium.

14. The dielectric composition according to claim 13, wherein the second subcomponent element is contained in an amount of 10 parts by mole or less with respect to 100 parts by mole of niobium in the composite oxide.

15. An electronic component, comprising a dielectric layer containing the dielectric composition according to claim 9.

* * * * *